June 19, 1956 H. V. EKSTEDT 2,750,707
INSECTICIDE DISPENSERS
Filed Aug. 6, 1953

INVENTOR.
HENRY V. EKSTEDT
BY
ATTORNEY

2,750,707
INSECTICIDE DISPENSERS

Henry V. Ekstedt, Overland, Mo.

Application August 6, 1953, Serial No. 372,657

7 Claims. (Cl. 43—131)

This invention relates in general to certain new and useful improvements in insecticide dispensers and more particularly to a device for dispensing liquid insecticides in a manner specifically suited to killing small crawling insects such as ants and the like.

Ants and related crawling insects have a high resistance to low-toxicity insecticides such as pyrethrins and the like which are relatively harmless to warm blooded animals. Hence, effective commercial ant-killing preparations contain arsenites, cyanides, and other highly toxic poisons. Such poisons are difficult to use because great care must be taken to prevent household pets and even small children from accidentally ingesting or absorbing a lethal dose thereof.

It is, therefore, the primary object of the present invention to provide a device for dispensing liquid insecticides which renders an adequate quantity of the insecticide accessible at all times to ants and other small crawling insects, while at the same time preventing wild animals, household pets, and children from accidentally coming in contact with the poison.

It is another object of the present invention to provide an insecticide dispenser of the type stated which is simple and inexpensive in construction.

It is a further object of the present invention to provide an insecticide dispenser of the type stated which can readily be filled and refilled and which automatically dispenses a controlled flow of the liquid insecticide in direct proportion to the rate at which the insecticide is used up by the insects.

With the above and other objects in view, my invention resides in the novel features of form, construction, arrangement, and combination of parts presently described and pointed out in the claims.

In the accompanying drawings (one sheet)—

Figure 2:
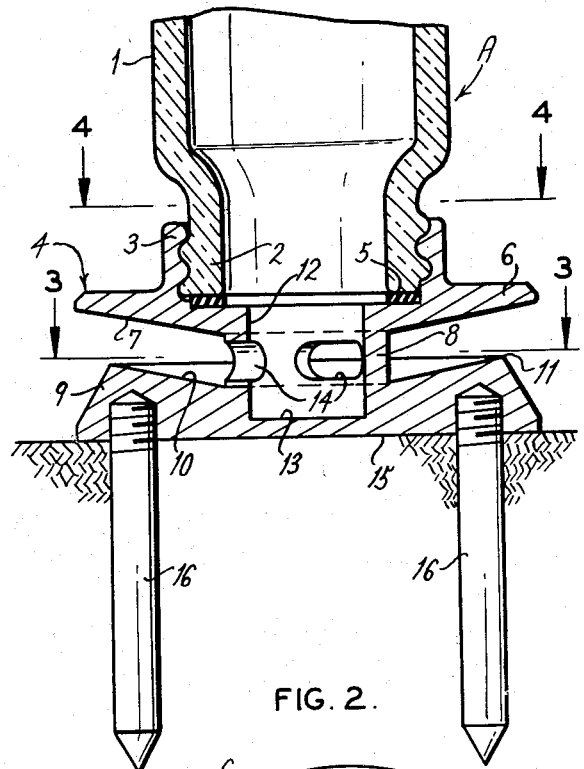
Figure 2 is a fragmentary sectional view taken along line 2—2 of Figure 1.
Figure 3:
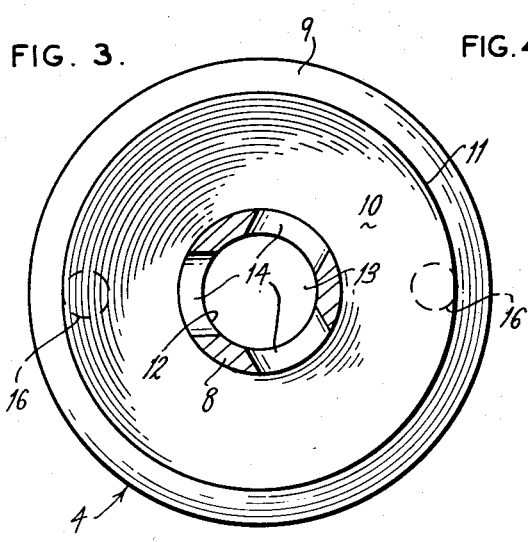
Figure 4:
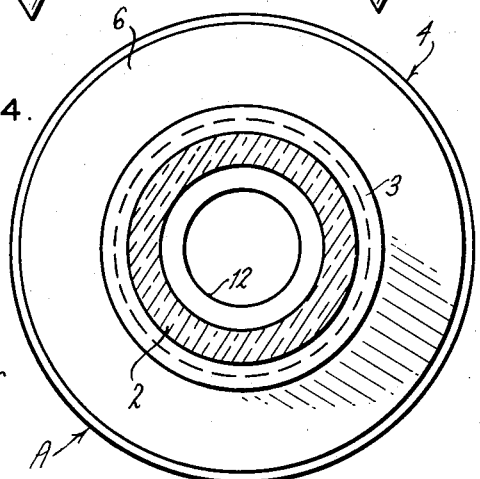

Figures 3 and 4 are transverse sectional views taken along lines 3—3 and 4—4 respectively of Figure 2.

Figure 1:
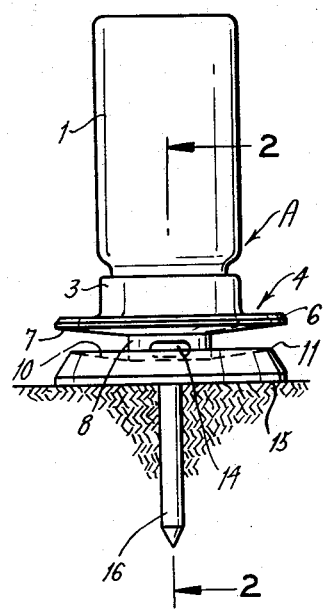
Figure 1 is a side elevational view of an insecticide dispenser constructed in accordance with and embodying the present invention.

Referring now in more detail and by reference characters to the drawings which illustrate a preferred embodiment of the present invention, A designates an insecticide dispenser comprising a bottle or vial 1 having a wide-mouthed screw-neck 2 for engagement in the internally threaded collar portion 3 formed as an integral part of a dispensing head 4, the end-face of the screw-neck 2 being seated against an annular sealing gasket 5. At its lower end, the collar 3 is integrally formed with a diametrally enlarged peripheral flange 6 the underface 7 of which is tapered inwardly and downwardly at a slight angle and adjoins a downwardly extending short tubular neck 8 of substantially smaller diametral size than the flange 6 and collar 3. At its lower end the neck is in turn integrally formed with a relatively thick base-disk 9 the upper face 10 of which is tapered upwardly and outwardly in spaced parallel relation to the face 7 of the flange 6, so that its peripheral margin or lip 11 is located substantially above the plane of intersection with the neck 8 when the dispenser A is in operative position as shown in Figures 1 and 2.

The neck 8 is internally bored to provide a liquid-delivery channel or passage 12 the lower end of which extends for a short distance into the base-disk 9 and terminates in a shallow, closed bottom well 13. The neck 8 is also provided with a plurality of circumferentially elongated radial discharge openings 14 communicating between the passage 12 and the narrow annular space between the tapered faces 7, 10.

Removably threaded into and depending from the under face 15 of the base-disk 9 is a pair of pointed pins 16 located in diametrally opposite relation adjacent the periphery of the base-disk 9, for stakewise insertion in the ground to hold the dispenser A erect and stationary when it is used out of doors. It will, of course, be understood that when used indoors the pins 16 may readily be removed and the dispenser will sit upright with its underface 15 resting upon the floor or any other suitable horizontal surface.

In preparing the insecticide dispenser A for use it is turned up so that the bottom of the bottle or vial 1 is in downward position. Thereupon the dispensing head 4 is unscrewed and removed so that the bottle 1 can be filled with a liquid insecticide. The dispensing head 4 is then replaced and screwed tightly down on the gasket 5 and the dispenser A may then be reinverted to the position shown in Figure 1. Air which has been trapped in the channel 12 will bubble up through the liquid to the upper portion of the bottle 1 and a few drops of insecticide of corresponding volume will trickle out through the openings 14 into the saucer-like depression formed by the downwardly tapered surface 10 of the base disk 9. Although the upper margins of the openings 14 are located above the peripheral lip 11 of the base disk 9 the surface tension of the liquid is sufficient to prevent further liquid discharge and the liquid will form rather large globules around each of the openings 14. As the insects are attracted to the insecticide and crawl through the space between the faces 7, 10 they will either directly consume the liquid insecticide or absorb some of it by surface contact. In either case, the liquid insecticide will be gradually consumed until the quantity is no longer sufficient to prevent a bubble of air from entering the bottle 1 through the openings 14 and thereupon the entering bubble of air will cause further downward displacement of the liquid renewing the supply thereof available for insect contact. This process will continue with intermittent replenishment of the liquid insecticide in the saucer-like depression of the base disk 9 until, finally, the supply of liquid insecticide in the bottle 1 is gone. At this time, of course, it will be necessary to refill the bottle 1. It will be noted that the vertical space between the tapered faces 7, 10 is wide enough to afford free access by small crawling insects such as ants, but is narrow enough to prevent accidental contact with the insecticide by larger creatures such as wild animals, household pets and the like.

It should be understood that changes and modifications in the form, construction, arrangement, and combination of the several parts of the insecticide dispenser may be made and substituted for those herein shown and described without departing from the nature and principle of my invention.

Having thus described my invention what I now claim and desire to secure by Letters Patent is:

1. An insecticide dispenser comprising an open-ended bottle-like container, a dispensing head removably mounted in closurewise position across the open end of the container, said dispensing head being provided with a tubular neck having an internal bore opening to the interior of the container and said neck being provided with a plurality of small apertures extending radially therethrough in the provision of passageways from the interior of the bore and also being provided with an axial bore which extends below the level of said apertures in the formation of a depressed well, and a saucer-like member forming a part of the dispensing head and extending circumferentially outwardly therefrom, said saucer-like member being provided with a conically tapered surface, the inner portion of which is directly below said apertures and above the bottom of the well when the dispenser is in operative position with the dispensing head presented downwardly.

2. An insecticide dispenser comprising an open-ended bottle-like container, a dispensing head removably mounted in closurewise position across the open end of the container, said dispensing head being provided with a tubular neck having an internal bore opening to the interior of the container and said neck being provided with a plurality of small apertures extending radially therethrough in the provision of passageways from the interior of the bore and also being provided with an axial bore which extends below the level of said apertures in the formation of a depressed well, and a saucer-like member forming a part of the dispensing head and extending circumferentially outwardly therefrom, said saucer-like member being provided with two vertically spaced co-axial conically tapered surfaces, the inner portions of which are respectively above and below said apertures and above the bottom of the well when the dispenser is in operative position with the dispensing head presented downwardly.

3. An insecticide dispenser comprising an open-ended bottle-like container, a dispensing head removably mounted in closurewise position across the open end of the container, said dispensing head being provided with a tubular neck having an internal bore opening to the interior of the container, and said neck being provided with a plurality of small apertures extending radially therethrough in the provision of passageways from the interior of the bore and also being provided with an axial bore which extends below the level of said apertures in the formation of a depressed well, and a saucer-like member forming a part of the dispensing head and extending circumferentially outwardly therefrom, said saucer-like member being provided with a conically tapered surface, the inner portion of which is directly below said apertures and above the bottom of the well when the dispenser is in operative position with the dispensing head presented downwardly, the outer margin of said surface being below the upper margin of the aperture, and a disk-like member also forming a part of the dispensing head and extending annularly outwardly from the neck portion in co-axially spaced relation to the saucer-like member.

4. An insecticide dispenser comprising an open-ended bottle-like container, a dispensing head removably mounted in closurewise position across the open end of the container, said dispensing head being provided with a tubular neck having an internal bore opening to the interior of the container, said neck being provided with a plurality of small apertures extending radially therethrough in the provision of passageways from the interior of the bore and also being provided with an axial bore which extends below the level of said apertures in the formation of a depressed well, a saucer-like member forming a part of the dispensing head and extending circumferentially outwardly therefrom, said member being provided with a conically tapered surface, the inner portion of which is directly below said apertures and above the bottom of the well when the dispenser is in operative position with the dispensing head presented downwardly, the outer margin of said surface being below the upper margin of the aperture, and a disk-like member also forming a part of the dispensing head and extending annularly outwardly from the neck portion in co-axially spaced parallel relation to the saucer-like member, the outer margin of the disk-like member being spaced circumferentially outwardly from the outer margin of the saucer-like member.

5. An insecticide dispenser comprising an openended bottle-like container, a dispensing head removably mounted in closurewise position across the open end of the container, said dispensing head being provided with a tubular neck having an internal bore opening to the interior of the container, said neck being provided with a plurality of small apertures extending radially therethrough in the provision of passageways from the interior of the bore, said apertures being elongated circumferentially with respect to the tubular neck so as to have upper and lower parallel margins, a saucer-like member forming a part of the dispensing head and extending circumferentially outwardly therefrom, said saucer-like member being provided with a conically tapered surface, the inner portion of which is directly below the lower margin of said apertures when the dispenser is in operative position with the dispensing head presented downwardly, the outer margin of said surface lying in a plane which is between the parallel margins of said apertures, a disk-like member also forming a part of the dispensing head and extending annularly outwardly from the neck portion in spaced parallel relation to the saucer-like member, and a plurality of spike-like pins mounted in and extending axially outwardly from the outer end of the dispensing head.

6. An insecticide dispenser comprising an open-ended bottle-like container, a dispensing head removably mounted in closurewise position across the open end of the container, said dispensing head being provided with a tubular neck having an internal bore opening to the interior of the container and said neck being provided with a plurality of small apertures extending radially therethrough in the provision of passageways from the interior of the bore, and a saucer-like member forming a part of the dispensing head and extending circumferentially outwardly therefrom, said saucer-like member having an upwardly and outwardly tapered conical surface the inner margin of which is below said apertures and the outer margin of which is substantially above the plane of said inner margin when the dispenser is in operative position with the dispensing head presented downwardly, said dispensing head also including an annular flange located in upwardly spaced relation to the saucer-like member and having a conically tapered underface presented toward the saucer-like member, said underface tapering upwardly and outwardly with its inner margin located above the apertures and its outer margin located substantially above its said inner margin.

7. An insecticide dispenser comprising an open-ended bottle-like container, a dispensing head removably mounted in closurewise position across the open end of the container, said dispensing head being provided with a tubular neck having an internal bore opening to the interior of the container and said neck being provided with a plurality of small apertures extending radially therethrough in the provision of passageways from the interior of the bore, and a saucer-like member forming a part of the dispensing head and extending circumferentially outwardly therefrom, said saucer-like member having an upwardly and outwardly tapered conical surface the inner margin of which is below said apertures and the outer margin of which is substantially above the plane of said inner margin when the dispenser is in operative position with the dispensing head presented downwardly, said dispensing head also including an annular flange located in upwardly spaced relation to the saucer-like member and having a conically tapered underface presented toward the saucer-like member, said underface tapering upwardly and outwardly with its inner margin located above the apertures and its outer margin located substantially above its said inner margin, said flange having an outer diametral size substantially greater than the diametral size of the conical surface of said saucer member so that said flange will project outwardly in overhanging relation thereto.

References Cited in the file of this patent

UNITED STATES PATENTS

| | | |
|---|---|---|
| 516,637 | Higgins | Mar. 13, 1894 |
| 727,597 | Day | May 12, 1903 |
| 1,443,287 | Snyder et al. | Jan. 23, 1923 |
| 1,877,979 | Savage | Sept. 20, 1932 |
| 1,879,264 | Hughes et al. | Sept. 27, 1932 |
| 2,591,459 | Meany | Apr. 1, 1952 |